US011111876B2

(12) United States Patent
Asano et al.

(10) Patent No.: US 11,111,876 B2
(45) Date of Patent: Sep. 7, 2021

(54) CYLINDER HEAD

(71) Applicant: TOYOTA JIDOSHA KABUSHIKI KAISHA, Toyota (JP)

(72) Inventors: Masahiko Asano, Toyota (JP); Noboru Takagi, Toyota (JP); Naoto Hisaminato, Susono (JP); Minoru Okimura, Toyota (JP); Shinya Wakabayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/837,069

(22) Filed: Apr. 1, 2020

(65) Prior Publication Data

US 2020/0325846 A1 Oct. 15, 2020

(30) Foreign Application Priority Data

Apr. 12, 2019 (JP) .............................. JP2019-076316

(51) Int. Cl.
*F02F 1/42* (2006.01)
*F02F 1/30* (2006.01)

(52) U.S. Cl.
CPC .............. *F02F 1/4264* (2013.01); *F02F 1/30* (2013.01)

(58) Field of Classification Search
CPC ... F02F 1/42; F02F 1/4264; F02F 1/30; F01N 3/02; F01N 2260/02
See application file for complete search history.

(56) References Cited

U.S. PATENT DOCUMENTS

| 4,228,653 | A * | 10/1980 | Sperry ................. | F02F 1/4264 123/188.14 |
| 4,302,935 | A * | 12/1981 | Cousimano ............ | F01N 13/10 60/272 |
| 4,537,028 | A * | 8/1985 | Humke ................. | F02F 1/4264 60/272 |
| 5,816,210 | A * | 10/1998 | Yamaguchi ........... | F02F 1/4264 123/188.14 |
| 7,270,091 | B2 * | 9/2007 | Matsui ..................... | F02F 1/40 123/41.82 R |
| 10,337,449 | B2 * | 7/2019 | Hopf ........................ | F02F 1/42 |
| 2009/0000590 | A1 * | 1/2009 | Buhr ..................... | F02M 26/01 123/193.5 |
| 2015/0377101 | A1 * | 12/2015 | Nord ........................ | F01N 1/10 60/273 |

FOREIGN PATENT DOCUMENTS

JP 2014-134182 A 7/2014
JP 2014-137026 A 7/2014

* cited by examiner

*Primary Examiner* — Grant Moubry
*Assistant Examiner* — James G Moubry
(74) *Attorney, Agent, or Firm* — Sughrue Mion, PLLC (57) ABSTRACT

A cylinder head includes an exhaust port through which exhaust gas discharged out of a combustion chamber of an internal combustion engine passes. The cylinder head includes a first fin and a second fin projecting from an inner wall of the exhaust port and extending in a flow direction of the exhaust gas. The cylinder head includes a first projection projecting from the inner wall of the exhaust port and extending in a direction intersecting the first fin. The cylinder head also includes a second projection projecting from the inner wall of the exhaust port and extending in a direction intersecting the second fin.

8 Claims, 8 Drawing Sheets

CYLINDER HEAD

BACKGROUND

1. Field

The following description relates to a cylinder head for an internal combustion engine.

2. Description of Related Art

Japanese Laid-Open Patent Publication No. 2014-137026 discloses a cylinder head including protrusions (hereinafter referred to as fins) that protrude from the inner wall of an exhaust port. This document describes that when the heat of exhaust gas flowing through the exhaust port is transferred to the fins, the heat recycling efficiency of exhaust gas can be increased.

As the engine speed increases, the temperature of exhaust gas flowing through the exhaust port increases. In a case in which fins are arranged in an exhaust port like in the cylinder head disclosed in the document, as the temperature of exhaust gas flowing through the exhaust port becomes high, the amount of heat transferred from the exhaust gas to the fins may become excessive. When an excessive amount of heat is transferred from the exhaust gas to the fins, for example, the temperature of coolant circulating through the water jacket of the cylinder head may become excessively high. However, in the cylinder disclosed in the above-described document, the case in which the amount of heat transferred from exhaust gas to the fins becomes excessive is not taken into consideration.

SUMMARY

It is an objective of the present disclosure to provide a cylinder head capable of preventing situations in which when the temperature of exhaust gas flowing through an exhaust port is high, the amount of heat transferred from exhaust gas to fins is excessive.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above-described problem, a cylinder head according to a first aspect of the present disclosure includes an exhaust port through which exhaust gas discharged out of a combustion chamber of an internal combustion engine passes, a fin including a protrusion projecting from an inner wall of the exhaust port and extending in a flow direction of the exhaust gas passing through the exhaust port, and a projection projecting from the inner wall of the exhaust port and extending in a direction intersecting the fin.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A cylinder head 10 according to a first embodiment will now be described with reference to FIGS. 1 to 5.

Figure 1:
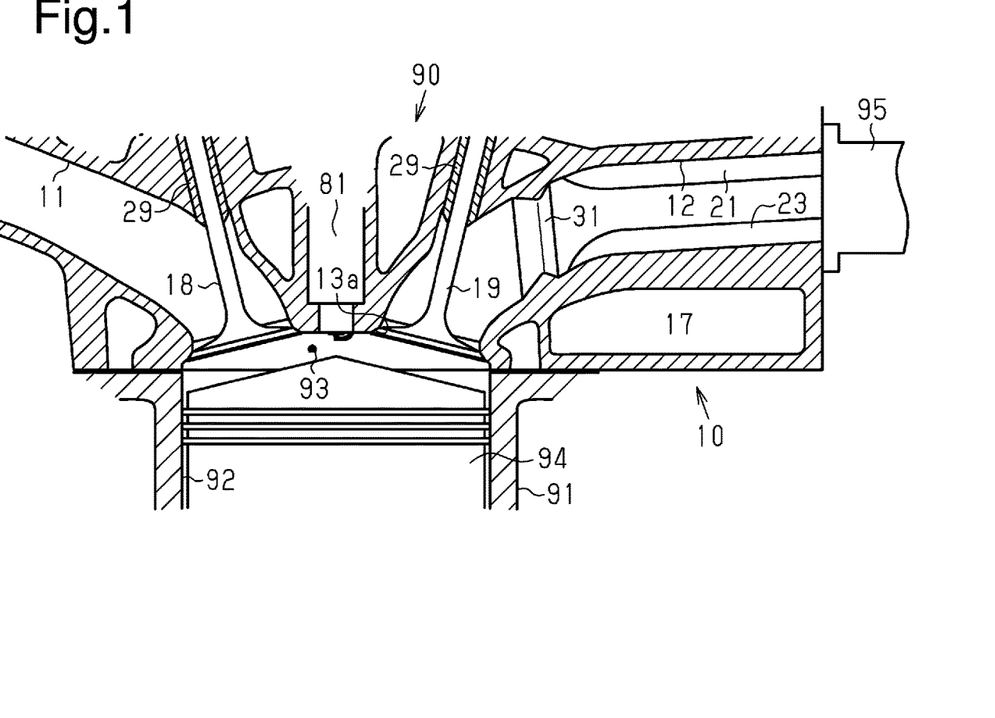
FIG. 1 is a cross-sectional view showing an internal combustion engine including a cylinder head according to a first embodiment.

FIG. 1 shows an internal combustion engine 90 including the cylinder head 10. The internal combustion engine 90 includes a crankshaft, which is an output shaft, and a piston 94 that can reciprocate in cooperation with rotation of the crankshaft. The internal combustion engine 90 includes a cylinder block 91 that accommodates the piston 94. The cylinder block 91 includes a cylinder 92 that accommodates the piston 94. The cylinder 92, the piston 94, and the cylinder head 10 define a combustion chamber 93. The internal combustion engine 90 is a multi-cylinder internal combustion engine. FIG. 1 shows one of the cylinders 92.

The cylinder head 10 includes an intake port 11 through which intake air is drawn into the combustion chamber 93. The cylinder head 10 includes an exhaust port 12 through which air-fuel mixture burned in the combustion chamber 93 is discharged as exhaust gas. The cylinder head 10 includes an intake valve 18 that connects and disconnects the intake port 11 to and from the combustion chamber 93. The cylinder head 10 includes a valve guide 29 that supports the intake valve 18. The cylinder head 10 includes an exhaust valve 19 that connects and disconnects the combustion chamber 93 to and from the exhaust port 12. The cylinder head 10 includes a valve guide 29 that supports the exhaust valve 19. In the internal combustion engine 90, a single cylinder 92 includes two intake valves 18 and two exhaust valves 19. FIG. 1 shows one of the intake valves 18 and one of the exhaust valves 19.

The internal combustion engine 90 includes an ignition plug 81. The ignition plug 81 is coupled to the cylinder head 10 with an electrode exposed to the combustion chamber 93. The cylinder head 10 includes a water jacket 17 as a passage where coolant circulates.

The internal combustion engine 90 includes an exhaust manifold 95. The exhaust manifold 95 is coupled to the cylinder head 10. Exhaust gas discharged from the combustion chamber 93 to the exhaust port 12 flows into the exhaust manifold 95.

Figure 2:
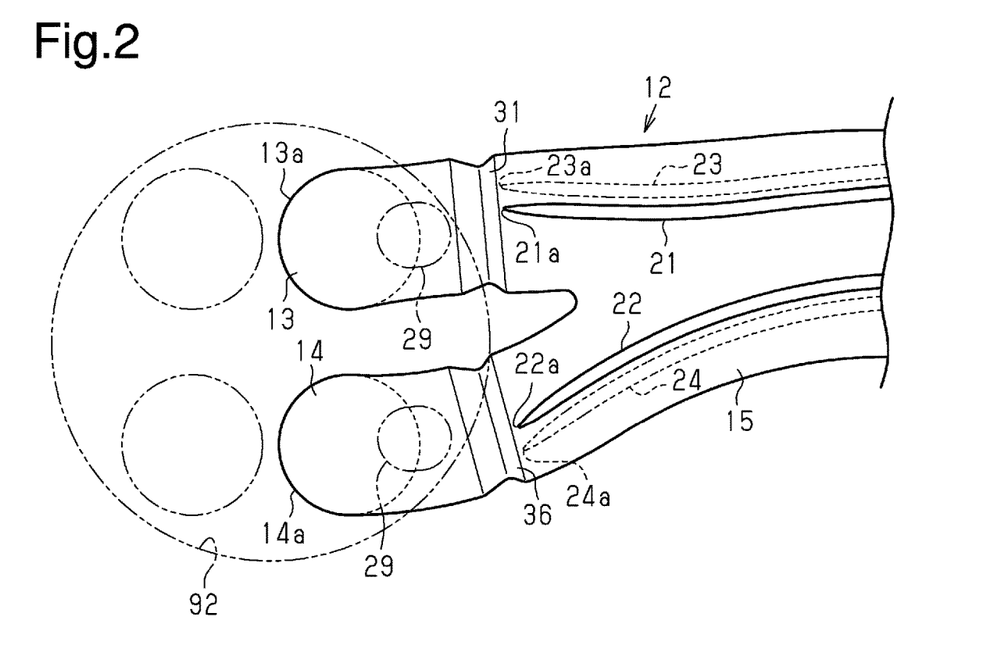
FIG. 2 is a schematic view showing the exhaust port of the cylinder head.

The exhaust port 12 will now be described with reference to FIGS. 1 and 2. FIG. 2 schematically shows the exhaust port 12 viewed from the valve guide 29.

As shown in FIG. 2, the exhaust port 12 connected to a single cylinder 92 includes a first upstream portion 13, a second upstream portion 14, and a downstream portion 15. The downstream portion 15 is located downstream of the first upstream portion 13 and the second upstream portion 14.

The first upstream portion 13 and the second upstream portion 14 are connected to the combustion chamber 93. The first upstream portion 13 includes a first inflow end 13a connected to the combustion chamber 93. The first upstream portion 13 extends downstream from the first inflow end 13a to merge with the second upstream portion 14 and connect to the downstream portion 15. The second upstream portion 14 includes a second inflow end 14a connected to the combustion chamber 93. The second upstream portion 14 extends downstream from the second inflow end 14a to merge with the first upstream portion 13 and connect to the downstream portion 15. Exhaust gas is discharged from the combustion chamber 93 to flow into the first upstream portion 13 and the second upstream portion 14 and then merge at the downstream portion 15.

The exhaust port 12 includes an inner wall 16 from which protrusions protrude. The protrusions extend in the flow direction of exhaust gas passing through the exhaust port 12. As shown in FIG. 2, the cylinder head 10 includes, as the protrusions, a first fin 21, a second fin 22, a third fin 23, and a fourth fin 24. FIG. 1 shows the first fin 21 and the third fin 23 of the four protrusions.

As shown in FIG. 2, the first fin 21 includes a first tip 21a that is an upstream end. The first tip 21a is located at the first upstream portion 13. The first fin 21 extends downstream from the first tip 21a. The first fin 21 is arranged at the first upstream portion 13 and the downstream portion 15. As shown in FIG. 1, the first fin 21 is located close to the valve guide 29 in the exhaust port 12.

As shown in FIG. 2, the third fin 23 includes a third tip 23a that is an upstream end. The third tip 23a is located at the first upstream portion 13. The third fin 23 extends downstream from the third tip 23a. The third fin 23 is arranged at the first upstream portion 13 and the downstream portion 15. As shown in FIG. 1, the third fin 23 is located close to the first inflow end 13a of the first upstream portion 13 in the exhaust port 12.

In the following description, the side where the valve guide 29 is arranged is referred to as an upper side of the exhaust port 12, and the side of the first inflow end 13a of the first upstream portion 13 is referred to as a lower side of the exhaust port 12. That is, the first fin 21 is arranged on the upper side of the exhaust port 12. The third fin 23 is arranged on the lower side of the exhaust port 12.

As shown in FIG. 2, the second fin 22 includes a second tip 22a that is an upstream end. The second tip 22a is located at the second upstream portion 14. The second fin 22 extends downstream from the second tip 22a. The second fin 22 is arranged at the second upstream portion 14 and the downstream portion 15. In the same manner as the first fin 21, the second fin 22 is arranged on the upper side of the exhaust port 12.

As shown in FIG. 2, the fourth fin 24 includes a fourth tip 24a that is an upstream end. The fourth tip 24a is located at the second upstream portion 14. The fourth fin 24 extends downstream from the fourth tip 24a. The fourth fin 24 is arranged at the second upstream portion 14 and the downstream portion 15. In the same manner as the third fin 23, the fourth fin 24 is arranged on the lower side of the exhaust port 12.

More specifically, the first fin 21 and the third fin 23 protrude from the inner wall 16 of the first upstream portion 13. The second fin 22 and the fourth fin 24 protrude from the inner wall 16 of the second upstream portion 14. The first to fourth fins 21-24 protrude from the inner wall 16 of the downstream portion 15.

In the downstream portion 15, the first fin 21 and the second fin 22 are laid out in the circumferential direction of the exhaust port 12. Also, in the downstream portion 15, the third fin 23 and the fourth fin 24 are laid out in the circumferential direction of the exhaust port 12.

Projections protrude from the inner wall 16 of the exhaust port 12. The projections extend in a direction that intersects the first to fourth fins 21-24. The cylinder head 10 includes a first projection 31. As shown in FIG. 2, the first projection 31 is located at the first upstream portion 13. The first projection 31 is located upstream of the first tip 21a and the third tip 23a. FIG. 1 shows the first projection 31.

The cylinder head 10 includes a second projection 36. As shown in FIG. 2, the second projection 36 is located at the second upstream portion 14. The second projection 36 is located upstream of the second tip 22a and the fourth tip 24a.

The first projection 31 will now be described in detail with reference to FIGS. 3 to 5. The second projection 36 at the second upstream portion 14 has the same structure as the first projection 31 at the first upstream portion 13 and thus will not be described in detail.

Figure 3:
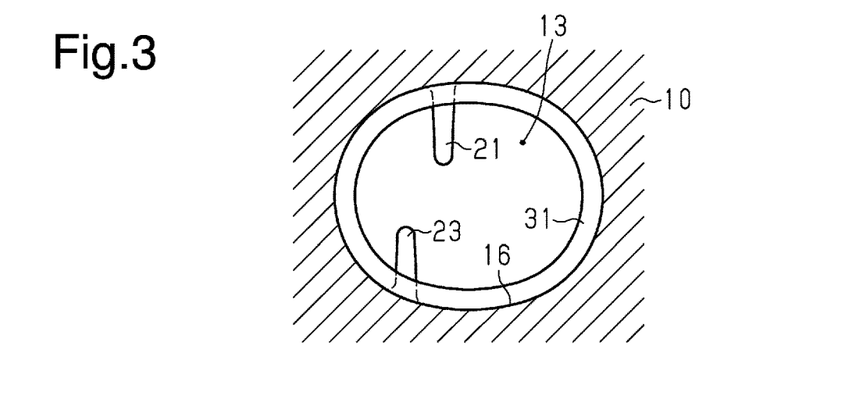
FIG. 3 is a cross-sectional view of the exhaust port of the cylinder head.

FIG. 3 is a cross-sectional view of the cylinder head 10 with the first fin 21 and the third fin 23 viewed from the upstream side of the first projection 31. As shown in FIG. 3, the first projection 31 projects from the inner wall 16 of the exhaust port 12. The height of the first projection 31 projecting from the inner wall 16 is less than the heights of the first fin 21 and the third fin 23 projecting from the inner wall 16. To facilitate understanding, the heights of the first projection 31 and the first to fourth fins 21-24 projecting from the inner wall 16 are exaggerated in FIGS. 3 to 5.

As shown in FIG. 3, the first projection 31 extends over the entire first upstream portion 13 in the circumferential direction. The first projection 31 narrows the cross-sectional flow area of the exhaust port 12.

Figure 4:
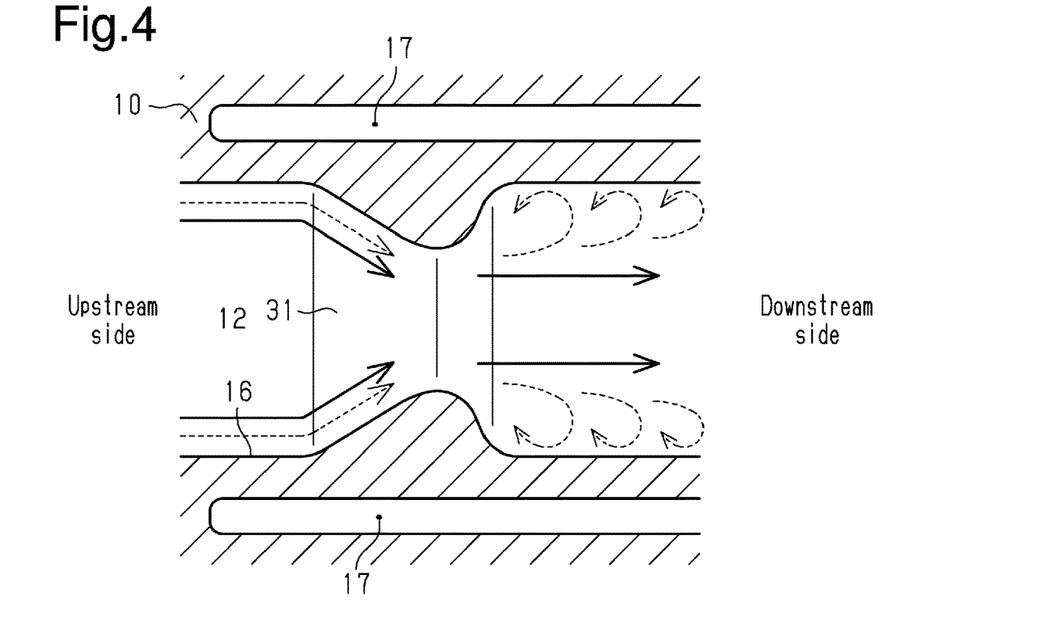
FIG. 4 is a cross-sectional view of the exhaust port of the cylinder head.

FIG. 4 is a cross-sectional view of the cylinder head 10 with the exhaust port 12 viewed in a direction that is orthogonal to the axis of the exhaust port 12. The water jacket 17 is located around the exhaust port 12. In the cross-sectional shape shown in FIG. 4, the first projection 31 includes a portion where the height of the first projection 31 projecting from the inner wall 16 becomes higher toward the downstream side and a portion where the height of the first projection 31 projecting from the inner wall 16 becomes lower toward the downstream side. That is, the first projection 31 is shaped such that the cross-sectional flow area of the exhaust port 12 is once narrowed and then returned to the original.

Figure 5:
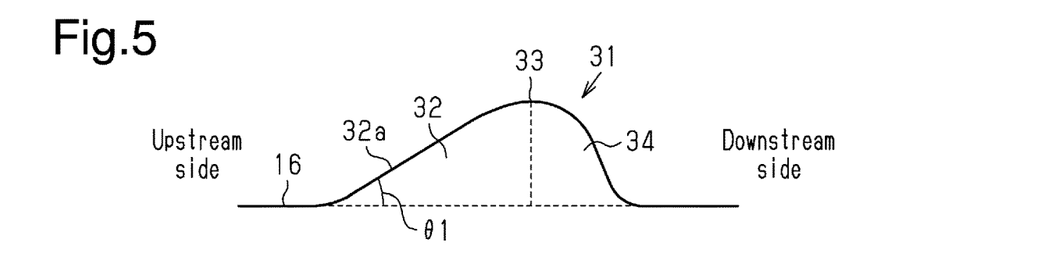
FIG. 5 is a schematic view showing a projection of the cylinder head.

FIG. 5 schematically shows the cross-sectional shape of the first projection 31 in FIG. 4. As shown in FIG. 5, the first projection 31 includes a front step 32 where the height of the first projection 31 projecting from the inner wall 16 becomes higher toward the downstream side. The front step 32 includes a guide surface 32a inclined so as to become farther from the inner wall 16 from the upstream end of the first projection 31 toward the downstream side. An inclination angle θ1 of the guide surface 32a relative to the inner wall 16 is acute. As shown in FIG. 5, the first projection 31 includes a rear step 34 where the height of the first projection 31 projecting from the inner wall 16 becomes lower from a top 33 toward the downstream side. At the top 33, the height of the first projection 31 projecting from the inner wall 16 is the highest. The length of the rear step 34 in the flow direction of exhaust gas is less than the length of the front step 32 in the flow direction of exhaust gas. That is, the top 33 is located downstream of the middle portion of the first projection 31 between the upstream end and the downstream end. Further, in the cross-sectional shape shown in FIG. 5, the first projection 31 includes a portion where the inclination angle relative to the inner wall 16 becomes gentle from the front step 32 toward the top 33 and a portion where the inclination angle relative to the inner wall 16 is zero.

The operation of the present embodiment will now be described.

The arrows in FIG. 4 schematically indicate the flow of exhaust gas passing through the exhaust port 12. The solid arrows indicate the flow of exhaust gas when the engine speed is high. The broken arrows indicate the flow of exhaust gas when the internal combustion engine 90 is operating idly.

As shown in FIG. 4, the first projection 31 projects from the inner wall 16. Thus, the exhaust gas flowing along the inner wall 16 collides with the first projection 31. More specifically, the exhaust gas flowing along the inner wall 16 collides with the guide surface 32a of the first projection 31 shown in FIG. 5. The exhaust gas that has collided with the guide surface 32a flows along the inclination of the guide surface 32a. Then, when flowing beyond the top 33 of the first projection 31, the exhaust gas separates from the inner wall 16.

When the engine speed is high, the flow speed of exhaust gas flowing through the exhaust port 12 is relatively high. As shown by the solid arrows in FIG. 4, the exhaust gas that has flowed beyond the first projection 31 tends to flow toward the downstream side along the axis of the exhaust port 12 away from the inner wall 16 of the exhaust port 12. Thus, the exhaust gas that has flowed beyond the first projection 31 does not easily flow close to the inner wall 16 of the exhaust port 12. This limits the collision of the exhaust gas that has flowed beyond the first projection 31 with the first fin 21 or the third fin 23 projecting from the inner wall 16 of the first upstream portion 13. Likewise, this limits the collision of the exhaust gas that has flowed beyond the second projection 36 with the second fin 22 or the fourth fin 24.

Further, as shown in FIG. 2, the first projection 31 is located upstream of the first tip 21a of the first fin 21 and the third tip 23a of the third fin 23. This limits situations in which the flow of exhaust gas flowing beyond the first projection 31 and separating from the inner wall 16 collides with the first tip 21a and the third tip 23a. Likewise, this limits situations in which the flow of exhaust gas flowing beyond the second projection 36 and separating from the inner wall 16 collides with the second tip 22a and the fourth tip 24a.

When the internal combustion engine 90 is operating idly, the flow speed of the exhaust gas flowing through the exhaust port 12 is relatively low. As compared to when the flow speed of exhaust gas is high, the flow that has been separated by the first projection 31 tends to flow closer to the inner wall 16 than the top 33 on the downstream side of the first projection 31 as shown by the broken arrows in FIG. 4. This causes the exhaust gas flowing close to the inner wall 16 to generate vortices. Thus, the boundary layer that is formed close to the inner wall 16 by the flow of exhaust gas into the exhaust port 12 is easily separated by the vortices on the downstream side of the first projection 31. Accordingly, the heat transfer coefficient is high in the proximity of the inner wall 16.

The advantages of the embodiment will now be described.

(1-1) When the flow speed of exhaust gas is high, the exhaust gas that has flowed beyond the first projection 31 or the second projection 36 does not easily flow close to the inner wall 16 of the exhaust port 12 and does not easily collide with the first to fourth fins 21-24 projecting from the inner wall 16. This reduces the amount of heat transferred from the exhaust gas to the first to fourth fins 21-24.

When the flow speed of exhaust gas is low, the exhaust gas that has flowed beyond the first projection 31 or the second projection 36 separates the boundary layer on the downstream side of the projections. Accordingly, the heat transfer coefficient is high in the proximity of the inner wall 16. That is, the transfer of heat from the exhaust gas to the first to fourth fins 21-24 or the inner wall 16 is expedited on the downstream side of the first projection 31 or the second projection 36.

More specifically, the first projection 31 and the second projection 36 projecting from the inner wall 16 of the exhaust port 12 can change the heat recycling efficiency in correspondence with the flow speed of exhaust gas. In the internal combustion engine 90, when the flow speed of exhaust gas is high, that is, when the engine speed is high, the temperature of the exhaust gas is high. When the flow speed of exhaust gas is low, that is, when the engine speed is low like in idling operation, the temperature of the exhaust gas is low. Thus, the transfer of heat from exhaust gas to the first to fourth fins 21-24 is not limited by the first projection 31 and the second projection 36 when the temperature of the exhaust gas is low, and the amount of heat transferred from exhaust gas to the first to fourth fins 21-24 is not excessive when the temperature of the exhaust gas is high.

(1-2) The first projection 31 projecting from the inner wall 16 of the exhaust port 12 includes the guide surface 32a. Thus, the exhaust gas flowing along the inner wall 16 collides with the guide surface 32a. Further, the guide surface 32a is inclined. This allows exhaust gas colliding with the guide surface 32a of the first projection 31 to flow toward the downstream side of the exhaust port 12. Additionally, in the front step 32 including the guide surface 32a, the height of the first projection 32 projecting from the inner wall 16 increases toward the downstream side. This causes the flow of exhaust gas flowing beyond the first projection 31 to easily separate from the inner wall 16 of the exhaust port 12. That is, the transfer of heat from exhaust gas to the first to fourth fins 21-24 is not limited by the first projection 31 when the temperature of the exhaust gas is low, and the amount of heat transferred from exhaust gas to the first to fourth fins 21-24 is not excessive when the temperature of the exhaust gas is high.

(1-3) The tip of a fin such as the first tip 21a of the first fin 21 or the third tip 23a of the third fin 23 easily collides with exhaust gas flowing through the exhaust port 12 and thus could easily increase excessively in temperature. The first projection 31 is located upstream of the first tip 21a and the third tip 23a. In this case, the exhaust gas that has flowed beyond the first projection 31 might not easily flow close to the inner wall 16 of the exhaust port 12 and might not easily collide with the first tip 21a and the third tip 23a. This limits an excessive increase in temperature of the tips of the fins. That is, the amount of heat transferred from exhaust gas to the fins is not excessive.

The present embodiment may be modified as follows. The present embodiment and the following modifications can be combined as long as the combined modifications remain technically consistent with each other.

In the above-described example, the first projection 31 projects from the inner wall 16 of the exhaust port 12 and extends over the entire exhaust port 12 in the circumferential direction. Instead, the projection may be shaped such that a part of the exhaust port 12 in the circumferential direction is cut out in a portion projecting from the inner wall 16 of the exhaust port 12. For example, the projection may be shaped as shown in FIG. 6.

Figure 6:
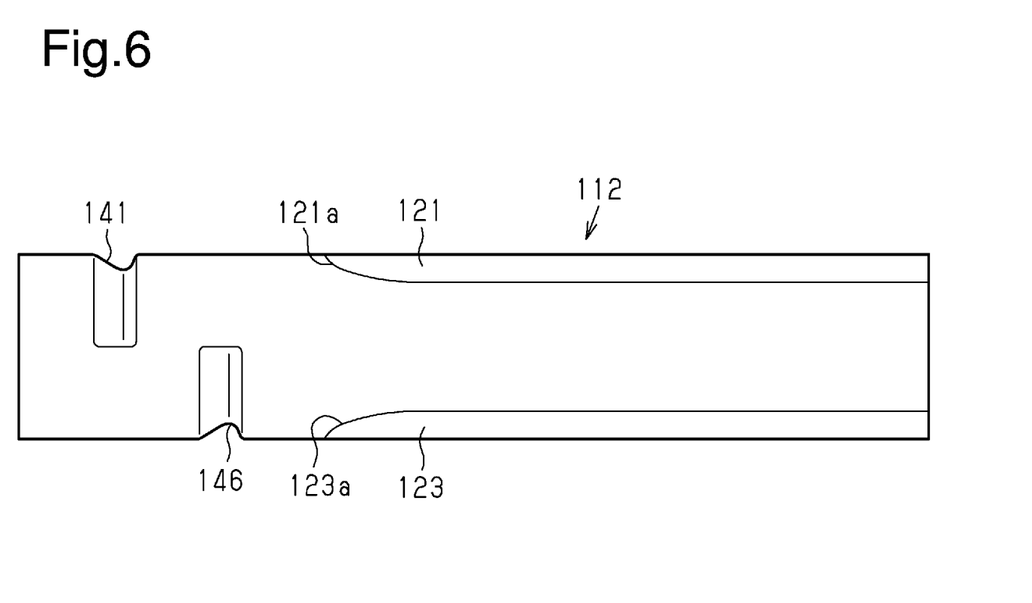
FIG. 6 is a schematic view showing the inner shape of an exhaust port in the cylinder head according to a modification.

FIG. 6 is a schematic view showing the inner wall of an exhaust port 112 arranged in the cylinder head. The upper side of the exhaust port 112 is provided with a first fin 121, and the lower side of the exhaust port 112 is provided with a third fin 123.

The exhaust port 112 internally includes an upstream projection 141 and a downstream projection 146 on the upstream side of a first tip 121a of the first fin 121 and a third tip 123a of the third fin 123.

The upstream projection 141 extends over the half of the exhaust port 112 in the circumferential direction. The upstream projection 141 projects from the upper side of the exhaust port 112 into the exhaust port 112. That is, the upstream projection 141 is shaped such that the lower half of the exhaust port 112 in the circumferential direction is cut out.

The downstream projection 146 is located downstream of the upstream projection 141 and upstream of the first tip 121a. The downstream projection 146 extends over the half of the exhaust port 112 in the circumferential direction. The downstream projection 146 projects from the lower side of the exhaust port 112 into the exhaust port 112. That is, the downstream projection 146 is shaped such that the upper half of the exhaust port 112 in the circumferential direction is cut out. Further, the downstream projection 146 is located downstream of the part of the upstream projection 141 that is cut out (i.e., a portion corresponding to the lower half of the circumference of the exhaust port 112).

When the cylinder head includes a projection that projects from the inner wall of the exhaust port, the portion provided with the projection has a decreased cross-sectional flow area of the exhaust port. Thus, when exhaust gas passes through the projection, pressure loss occurs. In the exhaust port 112 shown in FIG. 6, in the upstream projection 141, the lower half of the exhaust port 112 in the circumferential direction is cut out. When the exhaust port is partially cut out in the circumferential direction in such a manner, the cross-sectional flow area can be decreased to a smaller extent than when the upstream projection 141 is arranged over the entire exhaust port 112 in the circumferential direction. This reduces the pressure loss that occurs when exhaust gas passes through the upstream projection 141.

Additionally, in the exhaust port 112 shown in FIG. 6, the downstream projection 146 is located downstream of the part of the upstream projection 141 that is cut out. Thus, the exhaust gas that has passed through the upstream projection 141 without being separated from the inner wall can be separated from the inner wall by the downstream projection 146. That is, whereas the pressure loss is decreased, the amount of heat transferred from exhaust gas to the fins is not excessive when the temperature of the exhaust gas is high.

Like the first upstream portion 13 and the second upstream portion 14 of the first embodiment, the upstream projection 141 and the downstream projection 146 may be arranged close to the combustion chamber of the exhaust port 112 or close to the exhaust manifold of the exhaust port 112.

As long as the upstream projection 141 and the downstream projection 146 are shaped such that a part of the exhaust port 112 in the circumferential direction is cut out, the pressure loss can be decreased.

Further, only one of the upstream projection 141 and the downstream projection 146 may be arranged on the exhaust port 112. In this case, arranging the upstream projection 141 on the upper side of the exhaust port 112 easily separates the flow of exhaust gas. The reason for this can be explained with reference to FIG. 1. That is, the exhaust gas discharged from the combustion chamber 93 of the internal combustion engine 90 is blown against the part close to the valve guide 29 of the exhaust port 12. In other words, the exhaust gas discharged from the combustion chamber to the exhaust port flows toward the upper side of the exhaust port. Thus, as the projection projecting from the upper side of the exhaust port 12 is arranged on the upstream side as much as possible to bring the projection close to the valve guide, high-temperature exhaust gas does not easily flow close to the inner wall of the exhaust port 12.

Second Embodiment

Figure 7:
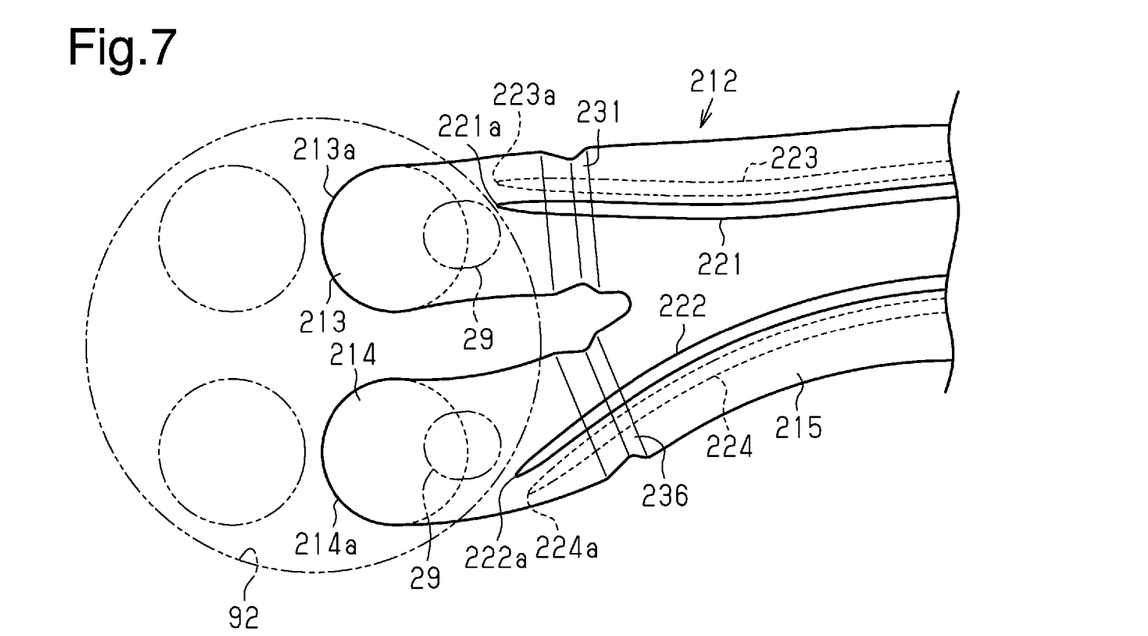
FIG. 7 is a schematic view showing an exhaust port of the cylinder head according to a second embodiment.

FIG. 7 shows an exhaust port 212 of the cylinder head according to a second embodiment.

In the first embodiment, the first projection 31 is located at the first upstream portion 13 on the upstream side of the first tip 21a and the third tip 23a. The second projection 36 is located at the second upstream portion 14 on the upstream side of the second tip 22a and the fourth tip 24a.

As shown in FIG. 7, the exhaust port 212 includes a first projection 231. The first projection 231 is located in a first upstream portion 213 on the downstream side of a first tip 221a and a third tip 223a. Likewise, the exhaust port 212 includes a second projection 236. The second projection 236 is located in a second upstream portion 214 on the downstream side of a second tip 222a and a fourth tip 224a. Other structures are basically the same as the first embodiment and thus will not be described.

As shown in FIG. 7, the first projection 231 extends downstream from a first inflow end 213a of the first upstream portion 213 connected to the combustion chamber 93. The first projection 231 extends over the entire first upstream portion 213 in the circumferential direction. The first projection 231 intersects a first fin 221 and a third fin 223 of the first upstream portion 213.

The second projection 236 extends downstream from a second inflow end 214a of the second upstream portion 214 connected to the combustion chamber 93. The second projection 236 extends over the entire second upstream portion 214 in the circumferential direction. The second projection 236 intersects a second fin 222 and a fourth fin 224 of the second upstream portion 214.

The operation of the present embodiment will now be described.

In the same manner as the first embodiment, the first projection 231 and the second projection 236 can separate the flow of exhaust gas from the inner wall of the exhaust port 212.

More specifically, when the engine speed is high and the flow speed of exhaust gas is relatively high, the exhaust gas that has flowed beyond the first projection 231 does not easily collide with the first fin 221 or the third fin 223 projecting from the inner wall of the first upstream portion 213. Likewise, the exhaust gas that has flowed beyond the second projection 236 does not easily collide with the second fin 222 or the fourth fin 224. Also, at a downstream portion 215, the first projection 231 and the second projection 236 limit the flow of exhaust gas close to the inner wall of the exhaust port 212. This limits the collision of exhaust gas with the first to fourth fins 221-224.

When the internal combustion engine is operating idly and the flow speed of exhaust gas is relatively low, a boundary layer separates on the downstream side of the first projection 231. This increases the heat transfer coefficient in the proximity of the inner wall of the exhaust port 212. Likewise, on the downstream side of the second projection 236, the heat transfer coefficient is high in the proximity of the inner wall of the exhaust port 212.

The advantage of the embodiment will now be described.

(2-1) When the flow speed of exhaust gas is high, the amount of heat transferred from exhaust gas to the first to fourth fins 221-224 can be reduced. When the flow speed of exhaust gas is low, the transfer of heat from exhaust gas to the first to fourth fins 221-224 or to the inner wall is expedited on the downstream side of the first projection 231 or the second projection 236.

More specifically, the transfer of heat from exhaust gas to the first to fourth fins 221-224 is not limited by the first projection 231 and the second projection 236 when the temperature of the exhaust gas is low, and the amount of heat transferred from exhaust gas to the first to fourth fins 221-224 is not excessive when the temperature of the exhaust gas is high.

The present embodiment may be modified as follows. The present embodiment and the following modifications can be combined as long as the combined modifications remain technically consistent with each other.

Figure 8:
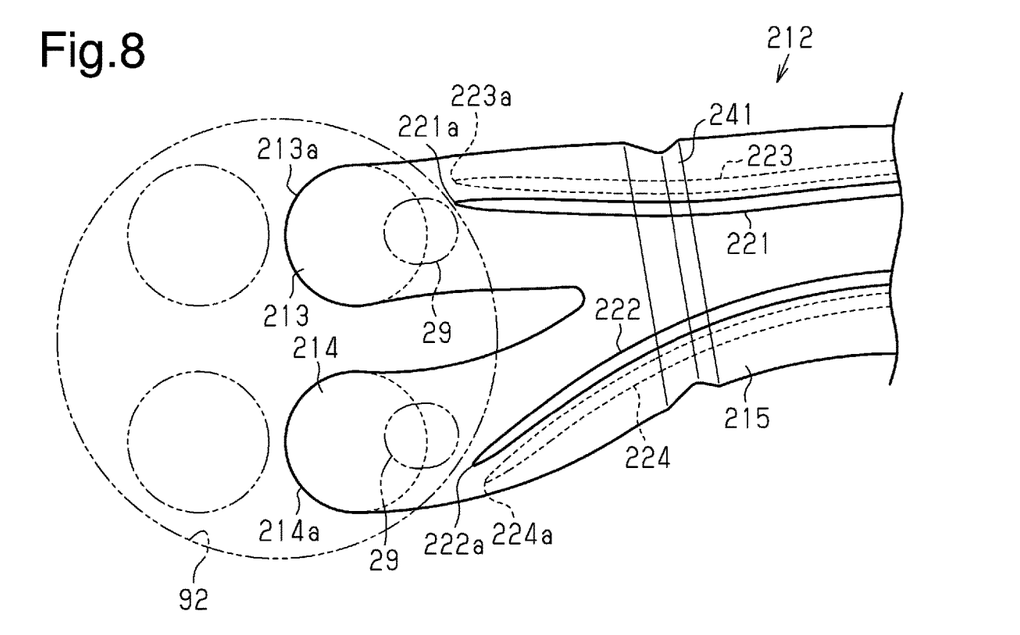
FIG. 8 is a schematic view showing the exhaust port of the cylinder head according to a modification.

Instead of arranging the first projection 231 in the first upstream portion 213 and arranging the second projection 236 in the second upstream portion 214, the downstream portion 215 of the exhaust port 212 may be provided with a projection as shown in FIG. 8.

FIG. 8 shows a downstream portion 241 located at the downstream portion 215 of the exhaust port 212. The downstream portion 241 intersects the first to fourth fins 221-224. In this case, when exhaust gas passes through the downstream portion 241, the flow of the exhaust gas separates from the inner wall of the exhaust port 212. That is, the same advantage as the second embodiment can be obtained.

Figure 9:
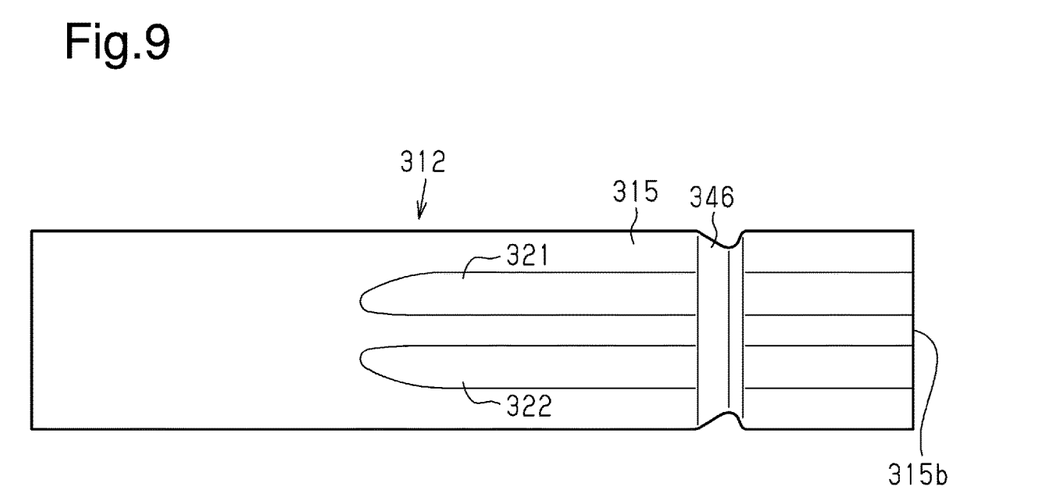
FIG. 9 is a schematic view showing the inner shape of an exhaust port in the cylinder head according to a modification.

FIG. 9 shows an exhaust port 312 including a downstream portion 315. In this example, the downstream portion 315 includes a downstream projection 346 that is arranged close to a downstream end 315b of the exhaust port 312. The downstream end 315b of the exhaust port 312 is an end out of which exhaust gas is discharged and which is connected to the exhaust manifold 95. The downstream projection 346 intersects fins of the exhaust port 312. FIG. 9 shows a first fin 321 and a second fin 322.

Figure 10:
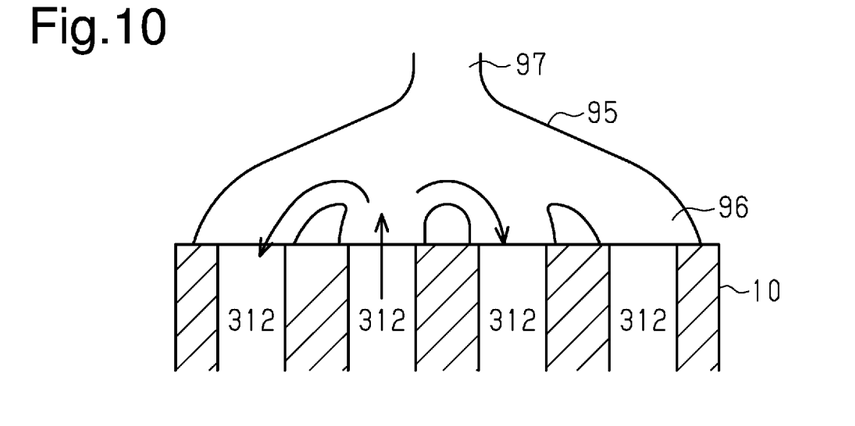
FIG. 10 is a schematic view showing the cylinder head and the exhaust manifold.

The operation and advantage of the downstream projection 346 will now be described with reference to FIGS. 10 and 11. FIG. 10 shows the cylinder head 10 and the exhaust manifold 95 connected to the cylinder head 10. The exhaust manifold 95 includes branches 96 into which exhaust gas discharged from the exhaust ports 312 of the cylinder head 10 flows. The exhaust manifold 95 includes a merge portion 97 where the branches 96 merge with one another.

Air-fuel mixture burned in the combustion chamber turns into exhaust gas and is discharged to one of the exhaust ports 312. Then, the exhaust gas flows into the branches 96 of the exhaust manifold 95. Some of the exhaust gas that has flowed into the branches 96 may flow back to another one of the exhaust ports 312 that is connected to a cylinder where combustion is not performed.

Figure 11:
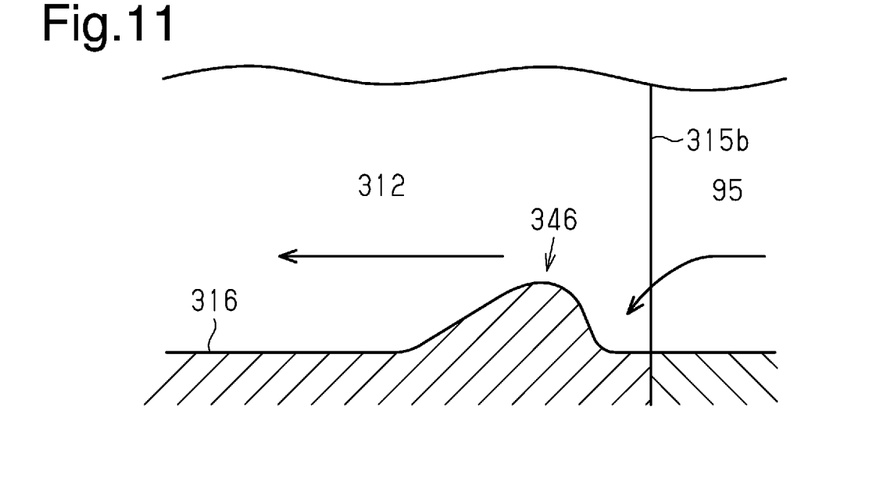
FIG. 11 is a cross-sectional view showing the projection of a modification.

FIG. 11 shows the structure of the cross section of the downstream end 315b of the exhaust port 312. As described above, some of the exhaust gas that has flowed into the branch 96 may flow back from the exhaust manifold 95 to the exhaust port 312. When the downstream projection 346 is arranged at the downstream portion 315 of the exhaust port 312, exhaust gas attempting to flow backward collides with the downstream projection 346. Thus, the flow of exhaust gas attempting to flow backward can be separated from an inner wall 316 of the exhaust port 312. That is, the exhaust gas attempting to flow backward does not flow close to the inner wall 316 of the exhaust port 312. This reduces the amount of heat transferred from the exhaust gas attempting to flow backward to the inner wall 316 to the fins.

Exhaust gas flowing from the exhaust manifold 95 back to the exhaust port 312 tends to flow toward the lower side of the exhaust port 312. Thus, when the downstream projection 346 is arranged on a part of the exhaust port 312 in the circumferential direction, the downstream projection 346 simply needs to be arranged on the lower side of the exhaust port 312.

The first projection 231 and the second projection 236 extend over the entire exhaust port 212 in the circumferential direction. Instead, projections intersecting fins may project from a part of the exhaust port 212 in the circumferential direction.

Figure 12:
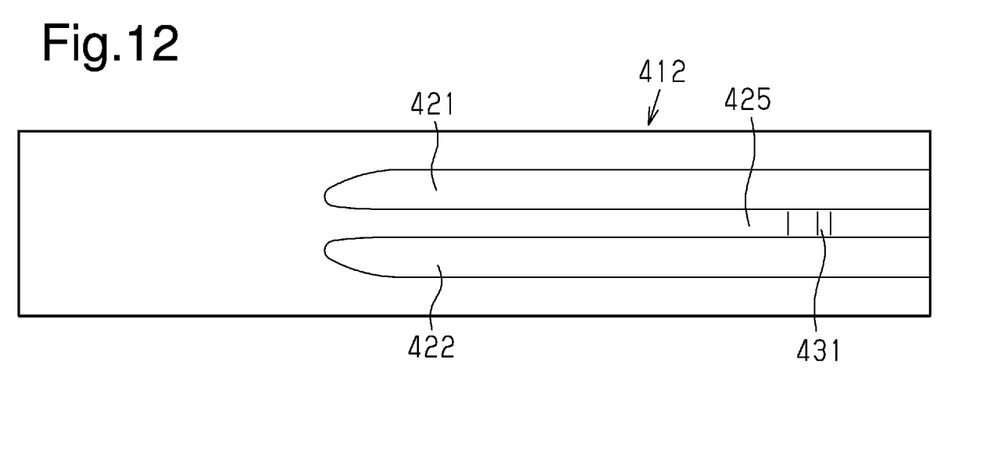
FIG. 12 is a schematic view showing an exhaust port of the cylinder head according to a modification.

For example, as shown in FIG. 12, an inter-fin projection 431 may be arranged in a gap 425 located between a first fin 421 and a second fin 422. The second fin 422 is arranged next to the first fin 421 in the circumferential direction of an exhaust port 412.

When the fins are laid out in the circumferential direction of the exhaust port 412 like the first fin 421 and the second fin 422, an increase tends to occur in the amount of heat transferred to the fins from exhaust gas passing through the gap 425, which is located between the first fin 421 and the second fin 422. The flow of exhaust gas passing through the gap 425 can be separated from the inner wall of the exhaust port 412 by arranging the inter-fin projection 431 in the gap 425. This prevents the amount of heat transferred to the first fin 421 and the second fin 422 from becoming excessive. When the projections intersecting the fins are arranged to project from a part of the exhaust port in the circumferential direction in this manner, the projections simply need to be arranged in the gap located between the fins.

In the example of FIG. 12, the inter-fin projection 431 is arranged in the gap 425 between the first fin 421 and the second fin 422. Instead, the inter-fin projection may be arranged in a gap between a third fin and a fourth fin. That is, an inter-fin projection simply needs to be arranged between fins laid out in the circumferential direction of the exhaust port and may be arranged on the upper side or the lower side of the exhaust port.

Further, in the example of FIG. 12, the inter-fin projection 431 is arranged only in the gap 425 between the first fin 421 and the second fin 422. Instead, projections may be arranged so as to intersect the first fin 421 and the second fin 422 in a range including the gap 425.

Third Embodiment

Figure 13:
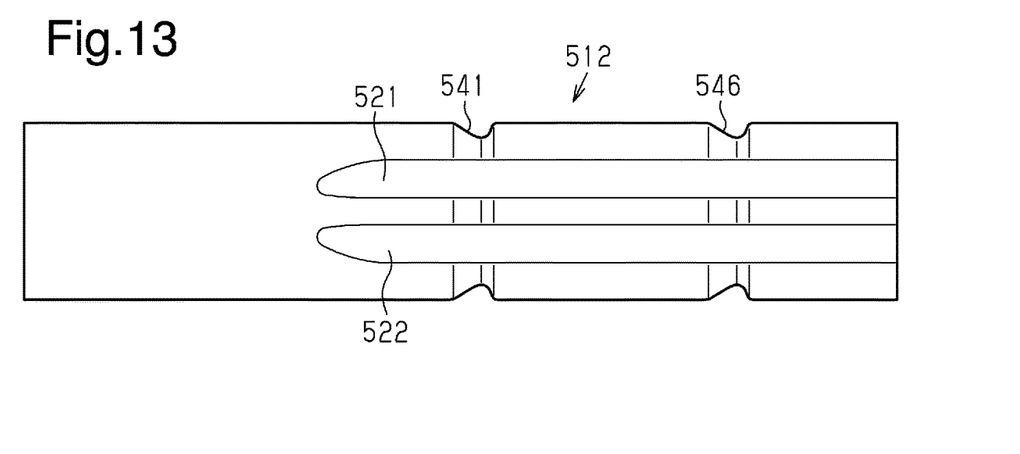
FIG. 13 is a schematic view showing an exhaust port of the cylinder head according to a third embodiment.

FIG. 13 shows an exhaust port 512 of the cylinder head according to a third embodiment.

As shown in FIG. 13, the exhaust port 512 includes an upstream projection 541 extending over the entire exhaust port 512 in the circumferential direction. Further, the exhaust port 512 includes a downstream projection 546 extending over the entire exhaust port 512 in the circumferential direction. The downstream projection 546 is located downstream of the upstream projection 541.

The upstream projection 541 and the downstream projection 546 intersect fins projecting from the inner wall of the exhaust port 512. FIG. 13 shows a first fin 521 and a second fin 522.

The operation of the present embodiment will now be described.

Figure 14:
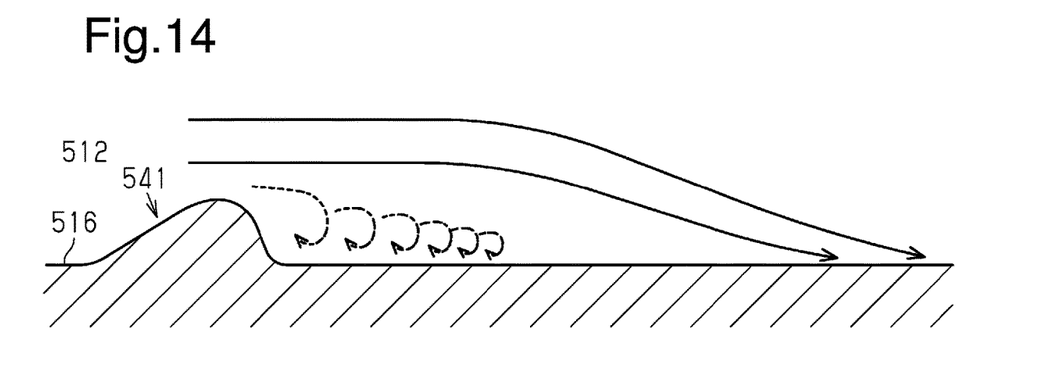
FIG. 14 is a schematic view showing the flow of exhaust gas in the exhaust port.
Figure 15:
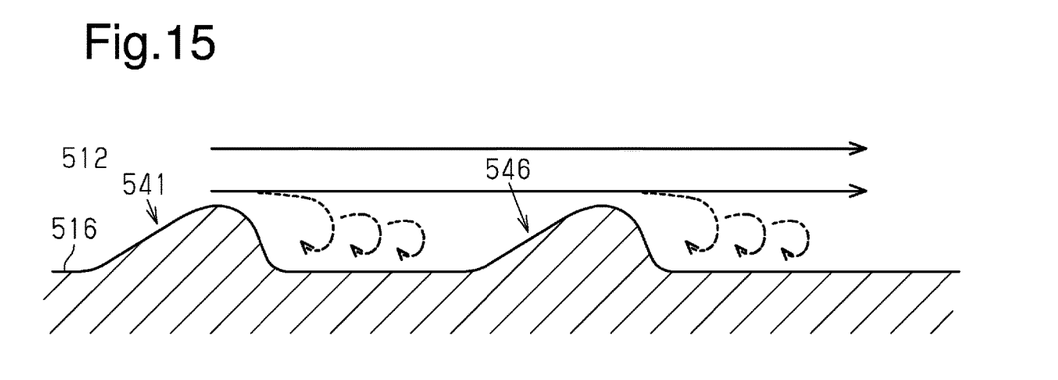
FIG. 15 is a cross-sectional view of the projection of the cylinder head.

FIGS. 14 and 15 schematically show the flow of exhaust gas flowing beyond the upstream projection 541 in the exhaust port 512. The solid arrows indicate the flow of exhaust gas when the engine speed is high. The broken arrows indicate the flow of exhaust gas when the internal combustion engine is operating idly.

As shown in FIG. 14, in the same manner as the first and second embodiments, the upstream projection 541 can separate the flow of exhaust gas from an inner wall 516 of the exhaust port 512.

As shown by the solid arrows in FIG. 14, when the engine speed is high, the flow of exhaust gas tends to approach the inner wall 516 of the exhaust port 512 after the exhaust gas flows beyond the upstream projection 541 and then flows toward the downstream side. As shown by the broken arrows in FIG. 14, when the engine speed is low, the vortices produced by the flow of exhaust gas tend to become smaller after the exhaust gas flows beyond the upstream projection 541 and then flows toward the downstream side.

In a case in which the downstream projection 546 is arranged downstream of the upstream projection 541 as shown in FIG. 15, when the engine speed is high, the flow of exhaust gas tends to separate from the inner wall 516 on the downstream side of the downstream projection 546. That is, even if the flow of exhaust gas that has flowed beyond the upstream projection 541 approaches the inner wall 516 of the exhaust port 512, the flow of the exhaust gas can be separated again from the inner wall 516 on the downstream side of the downstream projection 546. When the engine speed is low, the boundary layer can be separated on the downstream side of the downstream projection 546.

The advantages of the embodiment will now be described.

(3-1) When the engine speed is high, the section where exhaust gas does not easily flow close to the inner wall 516 of the exhaust port 512 can be lengthened as compared to a case in which only the upstream projection 541 is arranged. This limits the collision of the flow of exhaust gas with the fins projecting from the inner wall 516. Accordingly, the amount of heat transferred from exhaust gas to the fins is not excessive.

(3-2) When the engine speed is low, the section where the heat transfer coefficient is high in the proximity of the inner wall 516 can be lengthened as compared to a case in which only the upstream projection 541 is arranged. This expedites the transfer of heat from exhaust gas to the fins or to the inner wall 516.

The present embodiment may be modified as follows. The present embodiment and the following modifications can be combined as long as the combined modifications remain technically consistent with each other.

A projection may be arranged downstream of the downstream projection 546. That is, the number of projections is not limited to two.

The upstream projection 541 and the downstream projection 546 may have different shapes and sizes.

For example, the height of the downstream projection 546 projecting from the inner wall 516 may be set to be greater than the height of the upstream projection 541 projecting from the inner wall 516. The speed of exhaust gas flowing through the exhaust port 512 decreases toward the downstream side. Thus, in some cases, even if exhaust gas passes through the projections, the flow of exhaust gas is not easily separated from the inner wall. In the above-described structure, the separation of the flow of exhaust gas from the inner wall is facilitated by the downstream projection 546, which has a long projection height, on the downstream side of the exhaust port 512 where the flow speed of exhaust gas decreases.

The upstream projection 541 and the downstream projection 546 are arranged so as to intersect the fins projecting from the inner wall of the exhaust port 512. Instead, the upstream projection 541 may be arranged upstream of the fins such that the upstream projection 541 does not intersect the fins. Alternatively, the upstream projection 541 and the downstream projection 546 may be both arranged upstream of the fins so as not to intersect the fins.

Fourth Embodiment

Figure 16:
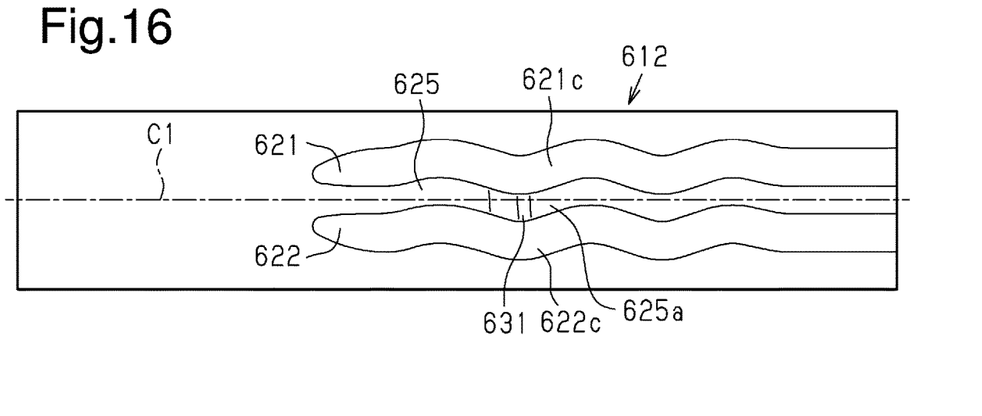
FIG. 16 is a schematic view showing an exhaust port of the cylinder head according to a fourth embodiment.

FIG. 16 shows an exhaust port 612 of the cylinder head according to a fourth embodiment.

The cylinder head of the first to third embodiments includes the fins that are protrusions projecting from the inner wall of the exhaust port and extending in the flow direction of exhaust gas passing through the exhaust port. In the fourth embodiment, as shown in FIG. 16, a first fin 621 and a second fin 622 respectively include a wave part 621*c* and a wave part 622*c*.

As shown in FIG. 16, the first fin 621 includes the wave part 621*c* having the form of a wave. The wave part 621*c* extends such that a gap 625 between the first fin 621 and the second fin 622 meanders. The second fin 622 includes the wave part 622c having the form of a wave. The wave part 622c extends such that the gap 625 between the first fin 621 and the second fin 622 meanders.

In FIG. 16, the axis of the exhaust port 612 is shown as a port extension line C1. The gap 625 between the wave parts 621c and 622c includes a meander portion 625a meandering with respect to the port extension line C1 as shown in FIG. 16.

Figure 18:
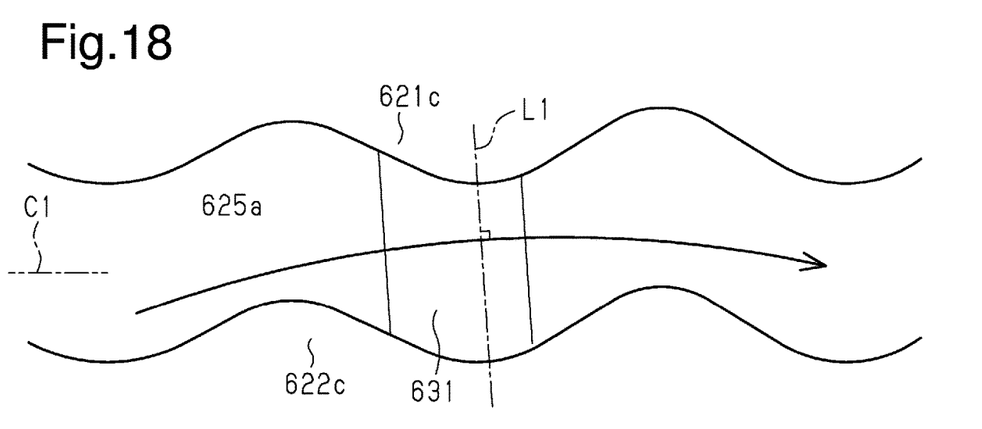
FIG. 18 is a schematic view showing the fins and the projection in the fourth embodiment.

In the exhaust port 612, the meander portion 625a of the gap 625 includes an inter-fin projection 631 as a protrusion. In FIG. 18, the flow of exhaust gas passing through the meander portion 625a is shown by the solid line. The exhaust gas passing through the meander portion 625a is separated from the side walls of the first fin 621 and the second fin 622. FIG. 18 shows an auxiliary line L1 that is orthogonal to the flow of exhaust gas passing through the meander portion 625a. The inter-fin projection 631 is arranged between the first fin 621 and the second fin 622 extending along the auxiliary line L1.

The operation of the present embodiment will now be described.

Figure 17:
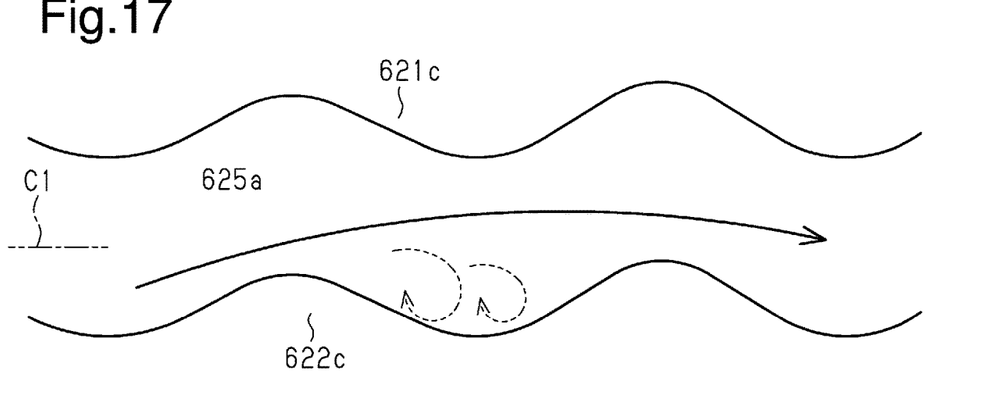
FIG. 17 is a schematic view showing the fins in the fourth embodiment.

As shown in FIG. 17, exhaust gas flowing through the meander portion 625a separates from the side walls of the first fin 621 and the second fin 622 instead of flowing along the port extension line C1. In FIG. 17, the flow of the exhaust gas that has separated from the side walls of the first fin 621 and the second fin 622 is shown by the solid line. That is, the flow of the exhaust gas in the meander portion 625a of the gap 625 between the first fin 621 and the second fin 622 can be separated using the wave parts 621c and 622c from the side walls of the first fin 621 and the second fin 622. In other words, when the flow speed of exhaust gas is high, the exhaust gas does not easily flow close to the side walls of the first fin 621 and the second fin 622. When vortices are formed in the meander portion 625a as shown by the broken lines in FIG. 17, the heat transfer coefficient is high in the proximity of the side walls of the first fin 621 and the second fin 622. That is, when the flow speed of exhaust gas is low, the heat transfer coefficient is high in the proximity of the side walls of the first fin 621 and the second fin 622.

As shown in FIG. 18, in the exhaust port 612, the meander portion 625a of the gap 625 between the wave parts 621c and 622c is provided with the inter-fin projection 631. Thus, when exhaust gas that has separated from the side wall of the first fin 621 or the second fin 622 flows beyond the inter-fin projection 631, the flow of the exhaust gas can be further separated from the inner wall of the exhaust port 612. That is, when the flow speed of exhaust gas is high, the exhaust gas does not easily flow close to the inner wall of the exhaust port 612. When the flow speed of exhaust gas is low, the heat transfer coefficient is high.

The advantages of the embodiment will now be described.

(4-1) When the flow speed of exhaust gas flows is high, the exhaust gas passing through the wave parts 621c and 622c does not easily flow close to the first fin 621 and the second fin 622. Further, the exhaust gas does not easily flow close to the inner wall. Thus, when the temperature of exhaust gas is high, the amount of heat transferred to the first fin 621 and the second fin 622 is not excessive.

(4-2) When the flow speed of exhaust gas is low, the heat transfer coefficient of the exhaust gas passing through the wave parts 621c and 622c tends to be increased in the proximity of the side walls of the first fin 621 and the second fin 622. Further, when exhaust gas passes through the inter-fin projection 631, the boundary layer easily separates from the two fins. This easily increases the heat transfer coefficient. Thus, when the temperature of exhaust gas is low, the transfer of heat from the exhaust gas to the first fin 621 and the second fin 622 is not limited.

(4-3) In the exhaust port 612, the inter-fin projection 631 extends so as to be orthogonal to the flow of exhaust gas passing through the meander portion 625a. Thus, the exhaust gas passing through the inter-fin projection 631 easily separates from the inner wall of the exhaust port 612.

The present embodiment may be modified as follows. The present embodiment and the following modifications can be combined as long as the combined modifications remain technically consistent with each other.

The extension direction of the inter-fin projection 631 does not have to be orthogonal to the flow of exhaust gas passing through the meander portion 625a. Instead, for example, the extension direction of the inter-fin projection 631 may intersect the flow of exhaust gas passing through the meander portion 625a at a given angle or may be orthogonal to the port extension line C1.

The inter-fin projection 631 is arranged at the meander portion 625a in the gap 625 between the first fin 621 and the second fin 622. As long as the meander portion 625a is provided with a projection, the same advantages as the fourth embodiment can be obtained. That is, the projection simply need to intersect the first fin 621 and the second fin 622 and project from the inner wall in a range including the meander portion 625a in the circumferential direction of the exhaust port 612.

The followings are modifications commonly applicable to each of the above-described embodiments.

The projections of each of the above-described embodiments may have a cross-sectional shape that differs from the cross-sectional shape shown in FIG. 5.

The height of the projections projecting from the inner wall may be changed. In each of the above-described embodiments, the projection height of the projections is less than the projection height of the fins that are protrusions. Instead, the projection height of the projections may be set in reference to the relative relationship with the projection height of the fins. For example, when the projection height of the fin is set to 1, the projection height of the projection is set to 0.8. The projection height of the projection can be set in a range smaller than 1 and can be set to, for example, 0.9, 0.5, or 0.3.

The inclination angle of the guide surface of the front step in the projection may be changed from the inclination angle θ1 shown in FIG. 5. It is preferred that the inclination angle of the guide surface be acute.

The length of the projection in the flow direction of exhaust gas may be changed. For example, a projection 731 may be provided as shown in FIG. 19.

Figure 19:
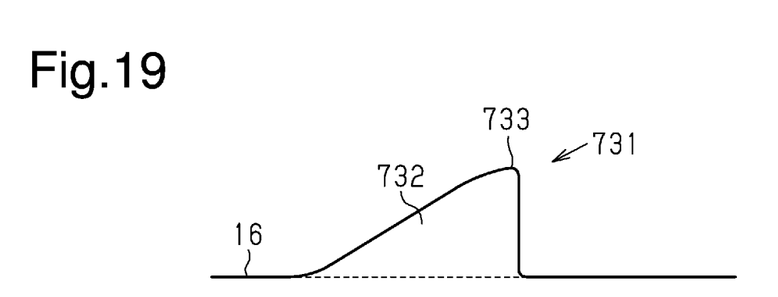
FIG. 19 is a schematic view of a projection of the cylinder head according to a modification.

As shown in FIG. 19, in the projection 731, the rear step 34 is omitted from the first projection 31 shown in FIG. 5. That is, the projection 731 includes a front step 732 and a top 733. The projection height of the front step 732 increases toward the downstream side. Thus, the projection does not have to include a rear step in which the projection height is lower on the downstream side than at the top.

The position of a separation point where the flow of exhaust gas passing through the projection separates from the inner wall may be changed depending on the shape of the projection. The length of the section where exhaust gas does not easily flow close to the inner wall or the section where the heat transfer coefficient is high in the proximity of the inner wall may be changed depending on the position of the separation point.

The projections of each of the above-described embodiments may be combined with one another. For example, the projection projecting from a part of the exhaust port in the circumferential direction may be combined with the projection arranged over the entire exhaust port in the circumferential direction. Alternatively, the projection arranged upstream of the tip of the fin may be combined with the projection intersecting the fin.

In each of the above-described embodiments, the projections arranged at the first upstream portion and the second upstream portion connected to the combustion chamber may be arranged at the downstream portion where the first upstream portion and the second upstream portion merge with each other.

In each of the above-described embodiments, as shown in FIG. 2, the first upstream portion 13 and the second upstream portion 14 are not symmetrical and have different lengths. Instead, the first upstream portion 13 and the second upstream portion 14 may be symmetrical.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A cylinder head comprising:
   an exhaust port through which exhaust gas discharged out of a combustion chamber of an internal combustion engine passes;
   a fin including a protrusion projecting from an inner wall of the exhaust port and extending in a flow direction of the exhaust gas passing through the exhaust port; and
   a projection projecting from the inner wall of the exhaust port and extending in a direction intersecting the fin, wherein
   an upstream end of the fin is a tip, and
   the projection is located upstream of the tip.

2. The cylinder head according to claim 1, wherein
   the projection includes a front step where a height of the projection projecting from the inner wall becomes higher toward a downstream side, and
   the front step includes a guide surface inclined so as to become farther from the inner wall from an upstream end of the projection toward the downstream side.

3. A cylinder head comprising:
   an exhaust port through which exhaust gas discharged out of a combustion chamber of an internal combustion engine passes;
   a fin including a protrusion projecting from an inner wall of the exhaust port and extending in a flow direction of the exhaust gas passing through the exhaust port;
   a projection projecting from the inner wall of the exhaust port and extending in a direction intersecting the fin;
   a first fin including the fin; and
   a second fin including a protrusion projecting from the inner wall of the exhaust port and extending in the flow direction of the exhaust gas passing through the exhaust port, the second fin being arranged next to the first fin in a circumferential direction of the exhaust port, wherein
   the projection is arranged in a gap between the first fin and the second fin.

4. The cylinder head according to claim 3, wherein the first fin and the second fin each include a wave part shaped such that the gap meanders.

5. The cylinder head according to claim 3, wherein
   the projection includes a front step where a height of the projection projecting from the inner wall becomes higher toward a downstream side, and
   the front step includes a guide surface inclined so as to become farther from the inner wall from an upstream end of the projection toward the downstream side.

6. A cylinder head comprising:
   an exhaust port through which exhaust gas discharged out of a combustion chamber of an internal combustion engine passes;
   a fin including a protrusion projecting from an inner wall of the exhaust port and extending in a flow direction of the exhaust gas passing through the exhaust port;
   a projection projecting from the inner wall of the exhaust port and extending in a direction intersecting the fin;
   an upstream projection including the projection; and
   a downstream projection projecting from the inner wall of the exhaust port and extending in the direction intersecting the fin, the downstream projection being arranged downstream of the upstream projection.

7. The cylinder head according to claim 6, wherein the upstream projection is shaped such that a part of the exhaust port in a circumferential direction is cut out in a portion of the upstream projection projecting from the inner wall, and
   the downstream projection is arranged downstream of the part of the upstream projection that is cut out.

8. The cylinder head according to claim 6, wherein
   the projection includes a front step where a height of the projection projecting from the inner wall becomes higher toward a downstream side, and
   the front step includes a guide surface inclined so as to become farther from the inner wall from an upstream end of the projection toward the downstream side.

* * * * *